(No Model.)

J. H. LEE.
LAWN TENNIS NET SUPPORT.

No. 337,591. Patented Mar. 9, 1886.

WITNESSES:

INVENTOR:
J. H. Lee
BY Munn & Co
ATTORNEYS.

UNITED STATES PATENT OFFICE.

JAMES HATTRICK LEE, OF CANANDAIGUA, NEW YORK.

LAWN-TENNIS-NET SUPPORT.

SPECIFICATION forming part of Letters Patent No. 337,591, dated March 9, 1886.

Application filed October 7, 1885. Serial No. 179,244. (No model.)

*To all whom it may concern:*

Be it known that I, JAMES HATTRICK LEE, of Canandaigua, Ontario county, New York, have invented a new and Improved Lawn-Tennis-Net Support and Tightener, of which the following is a full, clear, and exact description.

My invention relates to devices for supporting lawn-tennis nets and tightening the nets, when required, and has for its object to provide a simple, inexpensive, and efficient pole and ground-socket support for the net, which will allow the pole readily to be set up and taken down, and which will allow the net to easily and quickly be tightened without disconnecting the net from the poles.

The invention consists in a lawn-tennis net support and tightener comprising a pole to which the net-cords are adapted to be attached, a ground-socket adapted to receive the pole, and retaining devices on the pole and socket which prevent turning of the pole in the socket when the pole is in position to support the net, all as hereinafter fully described and claimed.

Reference is to be had to the accompanying drawings, forming part of this specification, in which similar letters of reference indicate corresponding parts in both figures.

Figure 1:
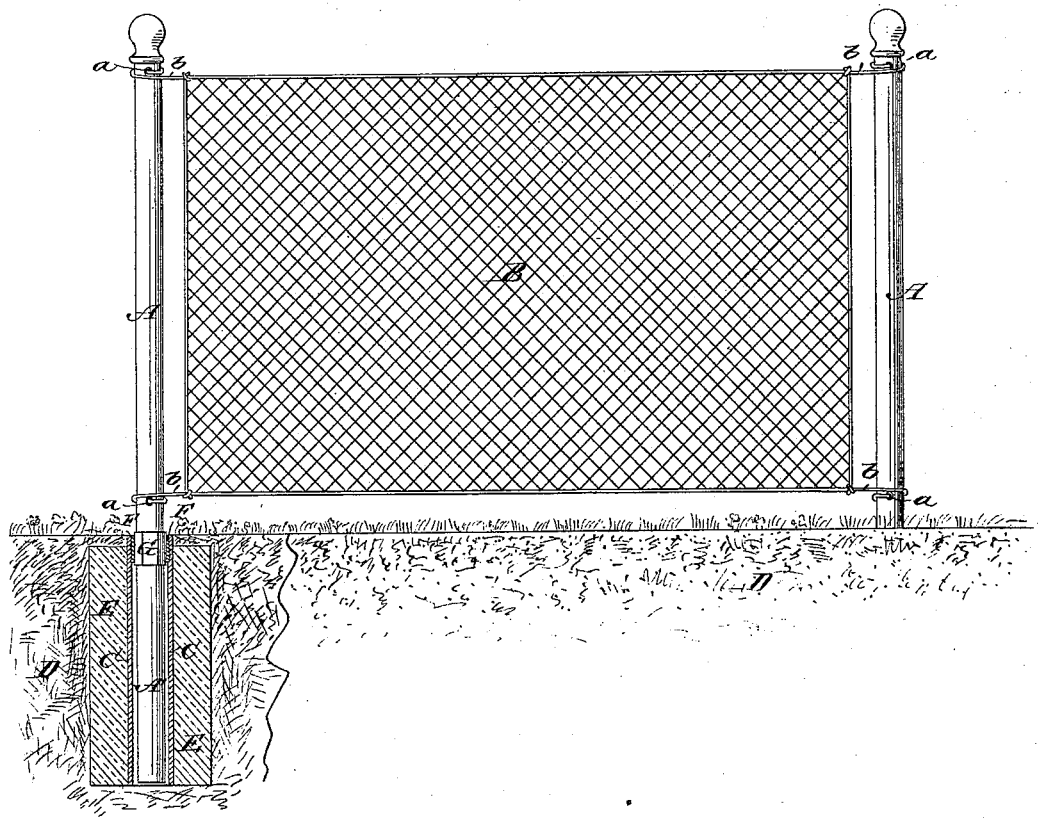
Figure 2:
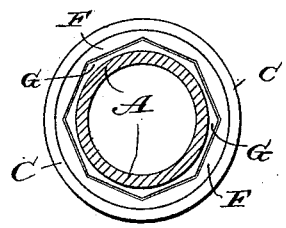

Figure 1 is a side view of a lawn-tennis net supported in accordance with my invention, and with one of the pole-sockets and the adjacent earth in vertical sectional elevation; and Fig. 2 is an enlarged sectional plan view of one of the net-supporting poles and its socket.

The letters A A indicate the opposite poles, to which the opposite ends of the lawn-tennis net B are attached by means of cords $b$, passed through holes $a$, made through the poles. The poles are set a sufficient distance from the ends of the net, and the net-cords $b$ are of proper length to allow the net to be tightened by turning the poles, one or both of them, to wind the cords on the poles, as indicated in Fig. 1, and hereinafter more fully explained.

The poles A are placed within tubes or sockets C, which are secured or set firmly into the ground D by the use of concrete or cement E, which holds the sockets plumb and so that their upper ends stand about at the surface of the ground; hence the pole-sockets will not interfere with the passage of mowing-machines over the lawn for cutting the grass as often as is desirable or necessary.

Within the tubular pole-socket C, and at its top, is fixed in any approved way the collar F, the inside of which has a polygonal form, preferably eight-sided or octagonal, and to the pole is fixed a collar, G, which fits the interior of the socket-collar F when the pole A is placed in the socket, as shown clearly in Fig. 2.

It is obvious that when the pole A is set into the socket C, and so that the pole-collar G enters the socket-collar F, the pole will be held firmly to place and cannot turn either way, and when the net B becomes slack or loose and needs to be tightened up or stretched, either one or both of the net-poles A will be lifted sufficiently to disengage or withdraw their collars G from the socket-collars F, whereupon the pole or poles may be turned axially to wind the net-cords $b$ around them to fully and evenly stretch or tighten the net, and when the poles are lowered again, so that their collars G rest in the socket-collars F, the net B will be held securely in its stretched and tightened condition.

It is evident that the pole and socket-collars may have one or more corresponding flat sides, to prevent turning of the pole in its socket, and the number of the flat sides on the collars will depend on the thickness or diameter of the poles where the net-cords $b$ wind on them—as, for instance, with a pole of considerable diameter, which would draw up the cords $b$ considerably by a single complete turn of it, the octagonal collars will be preferred, as the cords then can be drawn up a little for every one-eighth turn of the pole.

For poles of less diameter the pole and socket-collars may have six, or four, or three corresponding flat sides, as will readily be understood. I prefer to make the poles A and sockets C of ordinary wrought-iron pipe.

It will be seen that the lower ends, A', of the poles which enter the ground-sockets C are smaller than the sockets, or fit loosely therein, so that the poles may very easily and quickly be placed in the sockets when setting up the net B, and may as readily be removed from the sockets when the game is finished or the lawn is to be mown.

I do not limit myself to the particular devices or means shown to prevent turning of the pole A in the ground-socket C when the pole is in position to support the net, as various devices for this purpose will readily suggest themselves as the mechanical equivalents of the flat-sided collars on the post and its socket, which at present is the preferred construction.

I am aware that a wire-fence tightener has been constructed with a loose thimble, with ratchet-cap and fastening-pins arranged around a stationary fence-post provided with a spring-pawl engaging the ratchet-cap on said thimble; also, that a tightener for fence-wires has been journaled transversely in two vertical posts, the tightener consisting of a round post having one end squared, and the other end squared and rounded beyond the squared part, and having a key passed through an aperture in the rounded portion. The post through which the squared and rounded end passed had a squared aperture, and I do not claim such constructions as of my invention.

Having thus described my invention, I claim as new and desire to secure by Letters Patent—

1. In a lawn-tennis-net support and tightener, the combination of the socket C, provided with an internal collar, F, having a polygonal opening, the polygonal collar G, fitted to the collar F, and the pole A, secured in the collar G and projecting beyond the collar into the socket C, substantially as described.

2. In a lawn-tennis-net support and tightener, the combination of the socket C, collar F, having a polygonal opening, the polygonal collar G, fitted to the collar F, the pole A, secured in the collar G and projecting beyond the collar into the socket C, and the cement E, surrounding and supporting the socket C, as herein specified.

JAS. HATTRICK LEE.

Witnesses:
H. DURMAN,
CLARK WILLIAMS.